Patented Nov. 22, 1938

2,137,377

UNITED STATES PATENT OFFICE 2,137,377

LAMINATED GLASS

Walter Bauer and Paul Weisert, Darmstadt, Germany, assignors to Röhm & Haas Company, Philadelphia, Pa.

No Drawing. Application February 20, 1934, Serial No. 712,170. In Germany February 21, 1933

20 Claims. (Cl. 49—81)

This invention relates to the manufacture of non-shatterable glass, particularly that in which polymers of compounds containing the vinyl group are used as the intermediate layer. Such materials have been used in the past for this purpose, but we have now found that the addition of cellulose esters to this material in amounts up to 20% of the weight of the polymerized material is very beneficial. Films of this material, when used as intermediate layers in laminated glass, yield products which are very resistant to blows and shocks over a wide range of temperature and are particularly good in this respect at low temperatures.

Among the materials which may be polymerized to yield the product suitable for the manufacture of laminated glass according to the present invention are acrylic and methacrylic acids, their methyl, ethyl, propyl, butyl, amyl, phenyl and benzyl esters; the chlorides, nitriles and amids of these acids, and the vinyl esters such as the bromide, chloride, acetate, propionate, butyrate and benzoate. These compounds may be used alone or in a mixture of two or more. In the latter case, the joint polymer of the monomeric substances yields very good material for an intermediate layer in laminated glass when used with cellulose esters according to the present invention.

Any of the ordinary esters of cellulose or mixtures thereof may be used. These include the acetate, propionate, nitrate, and the mixed esters such as the nitrate-acetate, acetate-propionate or the acetate-butyrate, which can be mixed with a polymerized derivative of acrylic and methacrylic acid to give clear, transparent films. In general the cellulose esters which give best results are those whose viscosity in 10% solution in ethyl acetate or acetone is greater than 3° Engler, when measured at 20° C. It is also advantageous when cellulose nitrate is used to add a stabilizer. For this purpose small amounts of urea, guanidin and its derivatives, phthalamid phenanthren, formaldehyde and zinc oxide may be added. When desired plasticizers such as the esters of phthalic, phosphoric, tartaric, adipic, stearic and citric acids, acetins, diphenylene oxide, etc., may be added. Likewise artificial and natural resins such as the copals, rosin, dammar, shellac, the aldehyde condensation products of p-toluenesulphonamid, phenol, urea, etc., as well as the condensation products of polybasic acids with polyhydric alcohols. Mineral oils, vegetable oils, such as linseed, soya bean, China-wood, etc., and dyestuffs may also be added to get any desired result.

The amount of plasticizer used depends upon the character of the polymerized material, a greater amount being required when the polymerized material is brittle. For instance, when polymerized ethyl acrylate is mixed with 5% of cellulose nitrate, only about 5% of plasticizer is necessary, whereas when polymerized ethyl methacrylate and 5% of cellulose nitrate are mixed, 30 to 40% of plasticizer will be required. The cellulose ester, plasticizer, etc., can be added to the polymerized material before, during or after polymerization.

The laminated glass can be made by forming the film of the material directly on one or both of two glass sheets and pressing them together with the film sides in contact or the film of laminating material can be prepared separately and subsequently pressed between two sheets of glass. The solution of laminating material may be poured on glass by hand or by any suitable machine.

The following examples are given by way of illustration and are not intended to limit the invention in any way as to the materials used or their proportions, or to the method of making the laminated glass. The figures for viscosity used in the examples and in the appended claims refer to degrees Engler for a 10% solution of the material in ethyl acetate at 20° C. The parts are by weight.

*Example 1.*—To a 25% solution of 70 parts of polymerized methyl acrylate, (viscosity 20–25°), in ethyl acetate are added five parts of cellulose nitrate (viscosity 340°), ten parts of di-methyl glycolphthalate and fifteen parts of dibutyl-phthalate. This solution is poured on a glass plate and the solvent evaporated, leaving a film 0.5 mm. thick. The glass with the dried film is placed in a bath of dibutylphthalate. A second glass sheet is placed in contact with the film side of the first one and the two are then pressed together at 70° C. and 10 atmospheres. A non-shatterable glass of improved quality is thus obtained.

*Example 2.*—To a 25% solution of 85 parts of polymerized ethyl acrylate (viscosity 10°), in ethyl acetate are added 10 parts of cellulose nitrate (viscosity 340°), 5 parts of diisobutyl-phthalate and 0.05 part of diphenyldiethylurea. A film 0.55 mm. thick is prepared from this solution and placed between two sheets of glass in a bath of cyclohexanol. The sheets of glass and film are pressed together at 60 to 70° C. A non-shatterable glass having improved resistance to shock between −10 and +50° C. is obtained.

*Example 3.*—80 parts of a polymerized substance obtained by the joint polymerization of equal parts of methyl acrylate and ethyl acrylate and having a viscosity of 15 to 20°, are made up in an 18% solution to which are added five parts of cellulose nitrate (viscosity 2500° Engler), 10 parts of diisobutylphthalate, 5 parts of diethylglycolphthalate and 0.05 part of urea. This solution is poured on two glass sheets and the solvent evaporated, leaving a film 0.25 mm. thick on each. The sheets are then placed together with the film sides in contact and pressed at about 70° C. and 15 atmospheres. A non-shatterable glass is obtained which is particularly resistant to shock and blow at low temperatures.

*Example 4.*—55 parts of polymerized ethyl methacrylate (viscosity 30 to 40°) is made up to a 20% solution in ethyl acetate. To this solution are added 2.75 parts of cellulose nitrate (viscosity 250°), 40 parts of dimethylglycolphthalate and 0.25 part of phenanthren. A film 0.6 mm. thick is made from this solution and pressed between two glass sheets and an improved non-shatterable glass is obtained.

*Example 5.*—82 parts of polymerized ethyl acrylate are made up to a 20 to 25% solution and to this solution are added 5 parts of cellulose nitrate (viscosity 340°), 5 parts of cellulose acetate-propionate (viscosity 34.3°), 8 parts of diamylphthalate and 0.05 part of phthalamid. The solution is poured on a glass sheet and after evaporation of the solvent a film 0.5 mm. thick remains. This glass sheet is placed in a bath of cyclohexanol, and a second glass sheet placed in contact with the film side. The two are then pressed together at 80° C. and an improved non-shatterable glass is obtained.

*Example 6.*—A joint polymer of 3 parts of methyl acrylate and 1 part of acrylic nitrile is prepared. 70 parts of this joint polymer are made up in acetone to a 20% solution and to this solution are added five parts of cellulose nitrate and 30 parts of dibutyl tartrate. A film 0.6 mm. thick is prepared and pressed between two glass sheets in the usual manner. A non-shatterable glass having improved resistance to shock and blow is thus obtained.

*Example 7.*—60 parts of polymerized vinyl acetate (viscosity 40°) are made up to a 20% solution in ethyl acetate and to this solution are added 5 parts of cellulose acetate-propionate, 35 parts of diethylglycolphthalate and 0.1 part of acrylic amid. This solution is poured on a glass sheet and after evaporation of the solvent a film of 0.8 mm. thick remains. This glass sheet is united with a second glass sheet by means of the film by pressing at elevated temperatures and an improved non-shatterable glass is thus obtained.

*Example 8.*—To a 20% solution in methyl acetate of 72 parts of polymerized methyl acrylate, which was polymerized in the presence of 5 parts of cellulose nitrate and 2 parts of cellulose acetate, are added 15 parts of dibutylphthalate, 5 parts of dimethylglycolphthalate and 0.001 part of zinc oxide, and the resulting solution is poured on a glass sheet. On evaporation of the solvent, a film 0.4 mm. thick remains. A second glass sheet is united with the film side of the first one in a bath of cyclohexanol and the two sheets are pressed together at about 70° C. An improved non-shatterable glass is obtained.

*Example 9.*—65 parts of the joint polymer of equal parts of methyl acrylate, ethyl acrylate, ethyl methacrylate and acrylic nitrile are made up to a 20% solution in acetone with 5 parts of cellulose nitrate, 25 parts of dibutylphosphate, 10 parts of cyclohexyladipate and 2 parts of diphenlyene oxide. The solution is poured on a glass plate and the solvent evaporated. A second glass sheet is united with the film side of the first one by pressing at elevated temperature, and an improved non-shatterable glass is obtained.

*Example 10.*—65 parts of polymerized isoamylmethacrylate are made up to a 25% solution in ethylacetate with 5 parts of cellulose acetate-propionate, 30 parts of dibutyl tartrate and 1 part of p-toluenesulphonamid-formaldehyde resin, and a film 0.6 mm. thick is prepared from this solution. The film is placed in a bath of diethyleneglycolethyl ether between two glass sheets and these are then pressed together at elevated temperature. A non-shatterable glass so obtained is resistant to shock and blow over a wide range of temperature.

*Example 11.*—95 parts of a joint polymer of equal parts of methyl acrylate and ethyl acrylate are made up in solution with 5 parts of high viscosity cellulose nitrate and one part of di-ethyl-diphenyl urea. This solution was poured on a glass sheet and after drying was placed in a bath of diisobutylphthalate and a second glass sheet placed in contact with the film side. The whole was then pressed at elevated temperature and a very resistant non-shatterable glass obtained.

This invention is not limited by the above examples. Any of the ordinary solvents in which both the polymerized material and the cellulose ester are soluble may be used, as for example, chloroform, ethylene dichloride, amyl acetate, butyl acetate, or mixtures of these solvents with each other or with diluents which will not cause a precipitation of any of the components.

The process of polymerization may also be carried out in any desired way, for instance in the presence of suitable accelerators such as organic and inorganic peroxides or in the presence of light, heat or pressure.

In making the laminated glass, any suitable process may be used. The solution of the combined materials may be spread on one or both of two glass sheets and after evaporation of the solvent, may be pressed together, or the dry film of the laminating material may be prepared separately and then pressed between two glass sheets.

In making the laminated glass from the dry film, an adhesive may be used if desired. This adhesive may be made from the same or similar material as the dry film, or from any other suitable substance. Likewise the glass or the film or both may be moistened with a suitable plasticizer to assist in securing complete contact and the proper initial adhesion between the glass and the laminating material. The cellulose ester may be used in any amount up to 20% by weight of the polymerized material. This amount will vary with the desired results and will depend somewhat on the properties of the particular polymer or joint polymer with which it is used. With any given polymerized material, larger amounts of the cellulose will tend to yield a film material which is harder and stiffer than that obtained from the polymerized material alone. The hardness of the laminating material will be determined largely by the use for which it is intended. This may be varied to suit any possible conditions by adding various amounts of plasticizer or by a suitable choice of the polymerized material.

What we claim is:—

1. A non-shatterable laminated glass comprising a plurality of sheets of glass and as the interposed strengthening layer a material, comprising a polymer of at least one ester containing a vinyl group, and a cellulose ester in an amount not over 20% of the polymerized material.

2. A non-shatterable laminated glass comprising a plurality of sheets of glass and as the interposed strengthening layer a material, comprising a polymer of at least one ester containing a vinyl group, and a cellulose ester whose viscosity in 10% solution in ethyl acetate is at 20° C. greater than 3° Engler in an amount not over 20% of the polymerized material.

3. A non-shatterable laminated glass comprising a plurality of sheets of glass and as the interposed strengthening layer a material, comprising a polymer of at least one ester containing a vinyl group, a cellulose ester in an amount not over 20% of the polymerized material, and a plasticizer.

4. A non-shatterable laminated glass comprising a plurality of sheets of glass and as the interposed strengthening layer a material, comprising the joint polymer of at least two polymerizable esters containing the vinyl group, and a cellulose ester, in amount not over 20% of the joint polymer.

5. A non-shatterable laminated glass comprising a plurality of sheets of glass and as the interposed strengthening layer a material comprising the joint polymer of at least two polymerizable esters containing the vinyl group, a cellulose ester in amount not over 20% of the joint polymer, and a plasticizer.

6. A non-shatterable laminated glass comprising a plurality of sheets of glass and as the interposed strengthening layer a material comprising at least one polymerized ester of the group consisting of acrylic acid and methacrylic acid, and a cellulose ester in amount not over 20% of the weight of the polymerized ester.

7. A non-shatterable laminated glass comprising a plurality of sheets of glass and as the interposed strengthening layer a material comprising the joint polymer of at least one polymerizable ester containing the vinyl group and at least one polymerizable compound of the group consisting of the amids and nitriles of acrylic and methacrylic acids, and a cellulose ester in amount not over 20% of the weight of the joint polymer.

8. A non-shatterable laminated glass comprising a plurality of sheets of glass and as the interposed strengthening layer a material, comprising a polymer of methyl acrylate, and cellulose nitrate, the cellulose nitrate being present in amount not over 20% of the weight of the polymerized methyl acrylate.

9. A non-shatterable laminated glass comprising a plurality of sheets of glass and as the interposed strengthening layer a material comprising the polymer of vinyl acetate and a cellulose ester in amount not exceeding 20% of the weight of the vinyl acetate.

10. A non-shatterable laminated glass comprising a plurality of sheets of glass and as the interposed strengthening layer a material, comprising a polymer of methyl acrylate and cellulose nitrate, the cellulose nitrate being present in amount not over 20% of the weight of the polymerized methyl acrylate, and a plasticizer.

11. A non-shatterable laminated glass comprising a plurality of sheets of glass and as the interposed strengthening layer a material, comprising a polymer of vinyl acetate and a cellulose ester in amount not exceeding 20% of the weight of the vinyl acetate, and a plasticizer.

12. A non-shatterable laminated glass comprising a plurality of sheets of glass and as the interposed strengthening layer a material, comprising a joint polymer of an ester of acrylic acid and an ester of methacrylic acid, and a cellulose ester, the cellulose ester being present in amount not over 20% of the joint polymer.

13. A material suitable for the reinforcing layer in non-shatterable glass comprising the joint polymer of at least one polymerizable ester containing the vinyl group and at least one polymerizable compound of the group consisting of the amids and nitriles of acrylic and methacrylic acids, and a cellulose ester in amount not exceeding 20% of the weight of the polymerized material.

14. A material suitable for the reinforcing layer in non-shatterable glass comprising a polymer of an ester of the group consisting of acrylic and methacrylic acids, and a cellulose ester, the cellulose ester being present in amount not over 20% of the weight of the polymerized material.

15. A material suitable for the reinforcing layer in non-shatterable glass comprising a joint polymer of at least one ester of acrylic acid and at least one ester of methacrylic acid, and a cellulose ester, the cellulose ester being present in amount not exceeding 20% of the joint polymer.

16. As a new article of manufacture, a sheet of laminated safety glass comprising two sheets of glass and an interposed plastic layer formed by dispersing an organic cellulose derivative in an unpolymerized, unsaturated organic ester and then polymerizing said ester after complete mixing.

17. As a new article of manufacture, a sheet of laminated safety glass comprising two sheets of glass and an interposed layer of plastic material formed from a mixture of an organic cellulose derivative and a polymerized ester of an unsaturated organic compound polymerized in the presence of the said organic cellulose derivative.

18. As a new article of manufacture, a sheet of laminated safety glass comprising two sheets of glass and an interposed layer of plastic material formed from a mixture of an organic cellulose derivative and a polymerized ester of an unsaturated organic compound made by dissolving or dispersing the cellulose derivative in the unpolymerized ester of the unsaturated compound and then polymerizing the ester in the presence of the organic cellulose derivative solution or mixture.

19. As a new article of manufacture, a sheet of laminated safety glass comprising two sheets of glass and an interposed layer of plastic material formed from a plasticizer mixture of an organic cellulose derivative and a polymerized ester of an unsaturated organic compound polymerized in the presence of the said organic cellulose derivative.

20. A laminated plate consisting of a pair of glass sheets with an interposed reinforcing layer of an organic cellulose derivative including one of the lower aliphatic esters of acrylic acid which has been polymerized in the organic cellulose derivative in solution.

WALTER BAUER.
PAUL WEISERT.